Dec. 4, 1962

C. G. BERRY 3,066,726

PORTABLE HYDRAULIC PRESS

Filed March 2, 1959

INVENTOR.
CLAUDE G. BERRY
BY
Andrew F. Wintercorn
ATTORNEY

Dec. 4, 1962  C. G. BERRY  3,066,726
PORTABLE HYDRAULIC PRESS
Filed March 2, 1959  2 Sheets-Sheet 2

INVENTOR.
CLAUDE G. BERRY
BY

ATTORNEY

United States Patent Office 3,066,726
Patented Dec. 4, 1962

3,066,726
PORTABLE HYDRAULIC PRESS
Claude G. Berry, Rockford, Ill., assignor to Owatonna Tool Company, Owatonna, Minn., a corporation of Minnesota
Filed Mar. 2, 1959, Ser. No. 796,503
6 Claims. (Cl. 157—1.1)

This invention relates to portable hydraulic presses generally and is more particularly concerned with one designed for use in more expeditiously changing solid tires such as are used on the wheels of lift-trucks, the present novel press being installed under the rear end portion of the floor or bed of a truck in such a way that when the press is not in use and the press arbor is removed or its yoke is swung down out of the way, the truck floor is left clear of any obstructions or projections and the truck may accordingly be used in the same way as any other truck. With the press so installed and the appurtenances for the press, such as the pump and sump tank or housing, together with the drive motor, mounted on a supporting bracket under the floor there is ample road clearance and no obstruction in the way of the spare tire usually carried horizontally on another bracket under the bed at the rear of the truck. With this built-in press on a truck, the removal and application of solid tires on the wheels of factory type lift-trucks are greatly facilitated and the cost reduced, because the owner can change tires in the customer's plant or in his own shop, as desired, and he can accordingly provide faster service on the spot and avoid costly layup time on the customer's factory type lift-trucks, while also avoiding the necessity of costly extra trips, as otherwise one would be made for pick-up and the other for delivery of the work. The customer served the new way contemplated by my invention not only gets the work done quicker and cheaper but there is a better margin of profit left for the owner of the truck with the built-in press.

The majority of lift-trucks are equipped with wheels having solid tires, including a heavy steel band onto which the rubber is bonded, the band being pressed onto the rim of a cast iron wheel, and it requires from 40 to 60 tons pressure to apply such a tire, and a great deal more pressure—up to as much as 100 tons—to remove the same after the band bets rusted and set in place on the rim of the wheel after a long period of service. Heretofore, when conventional presses of 100-ton capacity were used, the press, comprising a huge upright frame built heavy enough to stand the 100-ton loading, was mounted upright on the bed of a one-ton truck, making the truck useful for only this one purpose, so that in comparison to the revenue to be derived (a fair charge for a tire change being only $1.00 per inch for width of tire) the operator had a far too large investment in the truck and press, considering the truck's adaptability for only the single purpose. The importance of having the press built-in as herein disclosed so as to allow unhampered use of truck for other purposes when the press is not being used should therefore be apparent.

Another feature of the hydraulic press of my invention is the ease with which it may be removed from the truck bed with its mounting plate if the occasion arises for mounting the press on a rolling base, as a portable shop press, in which event the mounting plate fitting in angle iron supports in the truck bed and arranged to lie flush with the top of said bed is replaced by another plate to close the opening in the bed so long as the press is removed, thus allowing the press to be used in a customer's shop or in the owner's shop while the truck is being used elsewhere as any other conventional truck.

The press of my invention is designed for the easy removal and application of solid tires on factory type lift trucks in all of the conventional sizes, adapter plates in a large range of diameters being arranged to be stacked around an arbor under a nut that is threaded down on the arbor into abutment with the plates, whereby to accommodate a large part of the range of tire sizes, and the arbor being adapted to be quickly and easily unthreaded and removed from the cross-head or ram, and a yoke pivoted to the cross-head and carrying a threadedly adjustable wheel abutting screw being arranged to be swung upwardly into position for operation on all of the rest of the range of smaller sizes of tires.

The press is easily controlled from the rear of the truck where a knob for turning a control shaft is arranged to be turned upwardly to a starting position and has one end of a chain attached thereto, the other end of which is attached to the cross-head so that when the pistons that are attached to the cross-head reach the lower end of their stroke, the knob is automatically pulled down by the chain to the reverse position for return movement of the pistons. The length of the stroke of the pistons may in this way be easily adjusted by connecting different links of the chain to the cross-head and in that way the press is made further adaptable to a large range of work.

The invention is illustrated in the accompanying drawings, in which—

Figure 2:
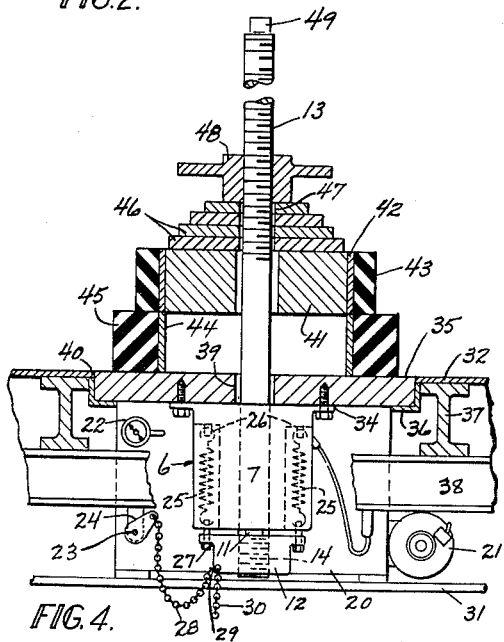
FIG. 2 is a view partly in vertical section on the line 2—2 of FIG. 1, and partly in rear elevation.
Figure 3:
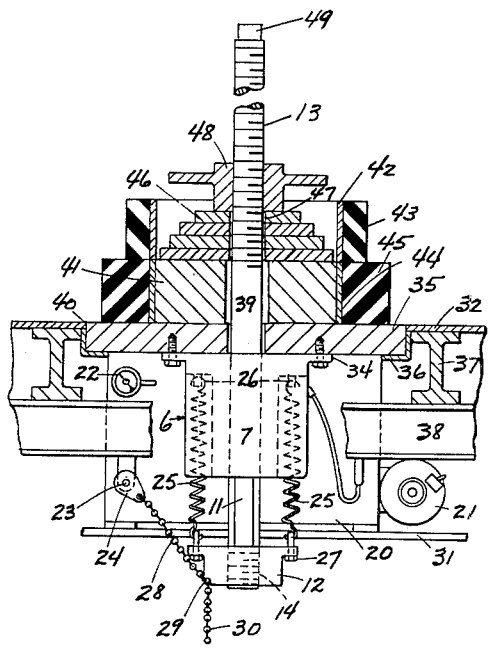
FIG. 3 is a similar view witth the parts shown at the end of the tire changing operation.
Figure 4:
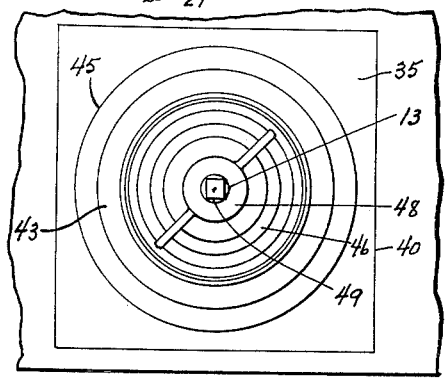
FIG. 4 is a top view of FIG. 2.
Figure 6:
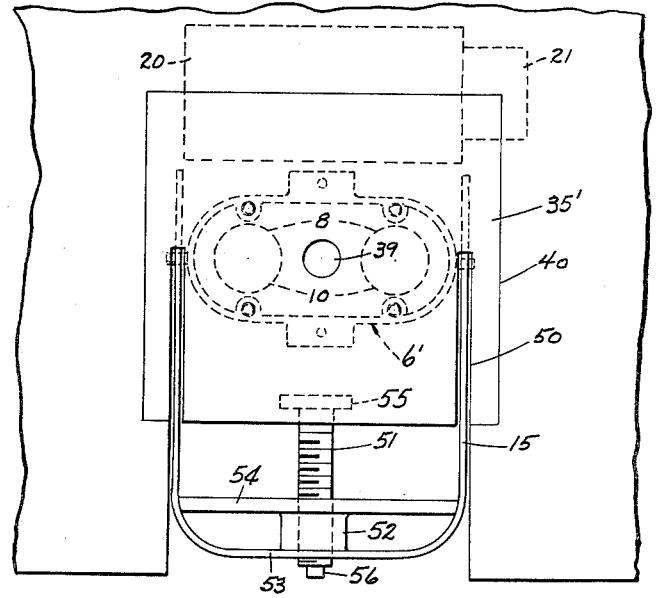
Figure 5:
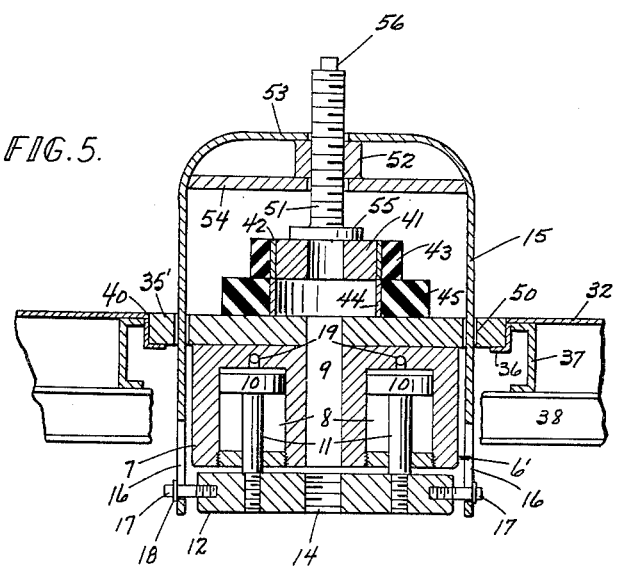
Figure 5:

FIG. 5 is a view similar to FIG. 2, showing another press in which the two pistons that in FIG. 2 are disposed in a vertical plane on the longitudinal center line of the truck are here disposed in a vertical plane at right angles to the center line of the truck, the press being otherwise the same as that shown in FIG. 2, but having a yoke pivotally connected to the cross-head for use in more convenienlty changing tires on smaller sizes of wheels, and FIG. 6 is a plan view of FIG. 5, but showing the yoke swung down out of the way so that the arbor shown in FIGS. 2 and 3 can be used in changing tires on larger sizes of wheels.

Similar reference numerals are applied to corresponding parts throughout the views.

Referring to the drawings, and at first more particularly to FIGS. 1 to 4, the reference numeral 6 designates the hydraulic press of my invention generally, which consists of a block 7 containing two parallel vertical cylinders 8 on opposite sides of a longitudinal vertical bore 9, the cylinders having pistons 10 reciprocable therein vertically and having their rods 11 connected to the opposite ends of a horizontal cross-head or ram 12. The latter is shown in FIGS. 1 to 4 as having an arbor 13 threaded into a center hole 14 in the cross-head and extending upwardly through the bore 9 to the work, but in the press 6' shown in FIGS. 5 and 6 the arbor 13 is removed and a U-shaped yoke 15 (not shown in FIGS. 1 to 4) is extended upwardly to the work, the yoke having elongated slots 16 in the lower end portions of the arms thereof to receive pins 17 extending from the opposite ends of the cross-head for a pivotal connection between the cross-head and yoke. Snap-rings 18 entered in annular grooves in the outer end portions of pins 17 serve to prevent displacement of the slotted ends of the yoke from the pins while permitting sliding movement of the yoke endwise to a retracted horizontal position relative to the cross-head when not in use, a suitable support (not shown) being provided on the truck for the outer end of the yoke in this position. The oil or other hydraulic fluid employed in the operation of the pistons 10 is delivered through ports 19 from a pump (not shown) mounted in the housing 20, the pump being driven by an electric motor 21, the current for which is supplied through an extension cord from any nearby outlet in the customer's shop or in the owner's shop. The housing 20 in addition to providing an enclosue for the pump also provides a pump for the oil or other hydraulic fluid employed, and a pressure gauge 22 is mounted on the housing and connected in the line from the pump to the cylinders 8 to indicate to the operator the operating pressure, this gauge being visible at the rear of the truck. A control rod 23 extends horizontally from the back of the housing 20 and is arranged to be turned manually by means of a knob 24 to the starting position shown in FIG. 2 for the starting of a cycle, which, if the press is controlled entirely manually would consist only of a down-stroke to a limit position, whereupon, when the pressure in the cylinders 8 above the pistons 10 exceeds a predetermined amount would cause the opening automatically of a relief valve for bypassing of additional oil from the pump back to the sump until the knob 24 was turned to the position shown in FIG. 3, substantially at right angles to the position of FIG. 2, whereupon the oil would be returned to the sump by action of the springs 25, of which there are two provided on each side of the cross-head 12 connected at their upper ends, as at 26, to the block 7 and at their lower ends, as at 27, to the cross-head 12. However, in the present case a flexible chain connection is provided, as indicated at 28 in FIGS. 2 and 3, between the knob 24 and the cross-head 12, so that the knob 24 is automatically swung from the "on" position shown in FIG. 2 to the "off" position shown in FIG. 3 at the end of the working stroke, and with this arrangement the operator need only turn the knob from the "off" position to the "on" position to start the cycle. With this arrangement it is also a simple matter to change the length of the working stroke by changing the connection at 29 using a different link of the chain 28 to obtain a shorter length of chain for a shorter working stroke and a longer length of chain for a longer working stroke, a convenient plan being to have the endmost links 30 colored differently for the different lengths of stroke, the instruction sheet or book given with the press telling which colored link should be used for each specified length of stroke.

The housing 20 with motor 21 attached is illustrated in FIGS. 2 and 3 as supported on a horizontal bracket 31, which is suitably attached to the frame of the truck 33 at the rear end thereof. The bracket 31 is high enough in relation to the horizontal bracket carrying the spare tire (not shown) under the rear end of the truck so that there is nothing to interfere with easy access to the spare tire. The block 7 for the press 6 is fastened by means of its flanges 34 to the underside of a mounting plate 35 that rests on angle iron supports 36 extending longitudinally with respect to the frame of the truck alongside of and secured to longitudinal frame members 37, which rest on and are secured to transverse frame members 38. The plate 35 has the top thereof flush with the top of the floor or bed 32 and, hence, when the arbor 13 is removed between tire changing jobs, the truck bed 32 is left clear for use of the truck in the same way as any other truck, the opening 39 for reception of the arbor being usually no serious objection. Should the operator ever desire to do so, he can remove the mounting plate 35 with the press 6 thereon from the truck and substitute another closure plate of the same size as the plate 35 to close the opening that would otherwise be left at 40 in the rear end portion of the bed or floor 32 of the truck, and in that event, the plate 35 can be used in mounting the press on a portable table rollable around the shop to whatever place is most convenient for tire changing operations, leaving the truck free to be used elsewhere during the time that the press is being used in the owner's shop or in a customer's shop.

FIGS. 2 and 3 show a tire changing operation, the cast iron wheel 41 with the old band 42 and worn solid tire 43 being shown in FIG. 2 in readiness for the application of the heavy pressure on the wheel 41 to force it out of the band 42 and into the band 44 of the new tire 45, in the manner shown in FIG. 3. Circular adapter plates 46, which have center holes 47 to receive the arbor 13, are stacked on top of the wheel 41, and a hand-nut 48, which may be of the well known two-piece hinged type quickly openable and closeable on the arbor to save time in application and removal thereof, is applied to the arbor over the adapter plates and tightened preparatory to the turning of the rod 23 by means of knob 24 to the starting position shown in FIG. 2. After the wheel 41 has been pressed into the band 44 out of band 42, the old tire 43 is, of course, loosened and can be removed with its band 42 and discarded or disposed of as junk, and it is a simple matter thereafter to remove the wheel from the arbor 13 after removal of the nut 48 and adapter plates 46. When there are no more tires to be changed, the arbor 13 can be loosened by means of a wrench applied to the square upper end 49, leaving the bed 32 of the truck clear of any projections and ready for use for other purposes.

Figure 1:
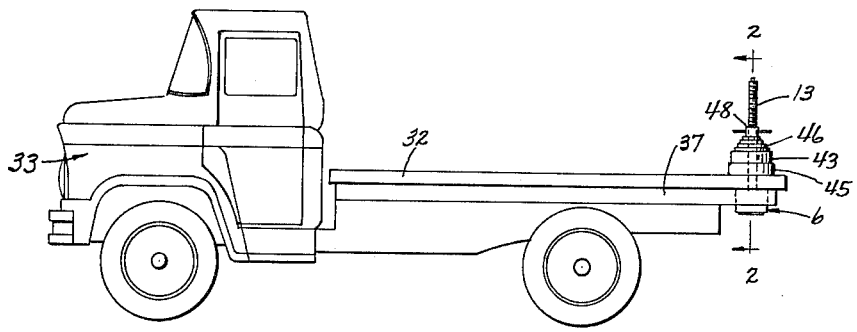
FIG. 1 is a side view of a truck having a hydraulic press built into the rear end thereof in accordance with my invention, the press being shown set up for and in use, similarly as in FIG. 2.

The press 6' shown in FIGS. 5 and 6 is the same as the press 6 of FIGS. 1 to 3 and corresponding parts have been correspondingly numbered, but the yoke 15 shown pivotally connected to the cross-head 12 is swingable from a substantially horizontal inoperative position shown in FIG. 6 upwardly through slots 50 in the bed plate 35' to the operative position shown in FIG. 5 for use in the changing of tires on smaller sizes of wheels 41 in a generally similar manner, the only difference being that screw 51 threadedly adjustable in a nut 52 welded or otherwise suitably secured between the cross-portion 53 of the yoke and a cross-brace 54 has a circular pad portion 55 on the inner end thereof that is small enough in diameter in relation to wheel diameters to be useful on the smallest diameter of wheel 41 apt to be encountered. A square end 56 on the outer end of the screw 51 receives a wrench to adjust the screw in or out to suit the job. Hence, when the screw is tightened against the wheel 41 and knob 24 is turned to the starting position of FIG. 2, the press 6' operates similarly as press 6 to force the wheel 41 out of the band 42 of the old tire 43 and press it into the band 44 of the new tire 45, and, at the end of the stroke, the chain 28, as described above, swings the knob 24 to the "off" position shown in FIG. 3, and the cross-head 12 is returned under the action of springs 25 to the starting position. Of course, with this purse 6', the operator can use the arbor 13 in the same way as described above in connection with press 6 when the yoke 15 is swung down to the out-of-the-way position shown in FIG. 6.

It is believed the foregoing description conveys a good understanding of the objects and advantages of my invention. The appended claims have been drawn to cover all legitimate modifications and adaptations.

I claim:

1. In a press of the character described, the combination of a cylinder block having pistons reciprocable in cylinders under fluid pressure, means for delivering fluid under pressure to said cylinders, a cross-head reciprocable with said pistons, a work support against the under side of which said block is mounted, said support having openings provided therein, a yoke of inverted U-form having the arms thereof extending through said openings and connected to said cross-head, and means on the cross-portion of the yoke for applying pressure on a work-piece resting on said support, said last mentioned means comprising a screw threaded in the cross-portion of the yoke for adjustment toward and away from the support and adapted to apply pressure on a work-piece resting on said support.

2. In a press of the character described, the combination of a cylinder block having pistons reciprocable in cylinders under fluid pressure, means for delivering fluid under pressure to said cylinders, a cross-head reciprocable with said pistons, a work support against the under side of which said block is mounted, said support having parallel slots provided therein, a U-shaped yoke having the arms thereof pivotally connected to said cross-head and movable through said slots to position the cross-portion of the yoke over said support, and means on the cross-portion of the yoke for applying pressure on a work-piece resting on said support.

3. In a press of the character described, the combination of a cylinder block having pistons reciprocable in cylinders under fluid pressure, means for delivering fluid under pressure to said cylinders, a cross-head reciprocable with said pistons, a work support against the under side of which said block is mounted, said support having parallel slots provided therein, a U-shaped yoke having the arms thereof pivotally connected to said cross-head and movable through said slots to position the cross-portion of the yoke over said support, and said yoke having slots provided in the arms thereof for slidably receiving the pivots and permitting movement of said yoke in the plane thereof relative to the pivots to a retracted position.

4. A truck mounted press of the character described having the bed plate of the truck as the base plate of the press, said bed plate including an outwardly projecting rear end portion having an opening provided therein, a press mounted on the underside of the outwardly projecting rear end portion of said bed plate and including a cross-head movable vertically downwardly under hydraulic pressure, and an arbor detachably connectible with the cross-head and extending vertically upwardly through the aforesaid opening and having means on the protruding upper end portion thereof for applying pressure on a work-piece resting on said bed plate, said bed plate having its top surface clear of any projections and useful for other purposes when the arbor is removed from the cross-head, said press structure being operable under hydraulic pressure, the press including a tank for housing a pump and to serve as a sump and also as a support for a motor for driving the pump, the press including a supporting bracket for said tank mounted below and in a fixed spaced relationship to the bed plate in forwardly spaced relation to the press structure so that the arbor is movable downwardly behind said bracket.

5. A truck mounted press of the character described having the bed of the truck as the base of the press, a press structure mounted on said bed by means of a mounting plate set in an opening provided therefor in the bed, said plate having the top surface thereof flush with the top of the bed and the press structure being mounted on the underside thereof so as to be out of the way when not in use, leaving the top of the bed unobstructed for other use, said press structure including a ram movable downwardly, and means extensible upwardly through the mounting plate from the ram and movable downwardly with the latter to apply pressure to work placed on top of the mounting plate.

6. A truck mounted press as set forth in claim 5, wherein the press structure is operable under hydraulic pressure, the press including a tank for housing a pump and to serve as a sump and also as a support for a motor for driving the pump, the press including a supporting bracket for said tank mounted below and in a fixed spaced relationship to the bed in forwardly spaced relation to the press structure so that the ram is movable downwardly behind said bracket, the mounting plate being removable from the bed for use elsewhere of the press structure carried thereon when a closure plate is substituted for the mounting plate in the opening in the bed.

References Cited in the file of this patent

UNITED STATES PATENTS

| | | |
|---|---|---|
| 1,441,755 | Alley | Jan. 9, 1923 |
| 1,532,532 | Fay | Apr. 7, 1925 |
| 1,638,476 | Dalton | Aug. 9, 1927 |
| 1,649,679 | Freivogel | Nov. 15, 1927 |
| 1,756,629 | Campbell | Apr. 29, 1930 |
| 2,228,086 | Rodgers | Jan. 7, 1941 |
| 2,238,424 | McQuade | Apr. 15, 1941 |
| 2,387,839 | Frost | Oct. 30, 1945 |
| 2,423,652 | Kelley | July 8, 1947 |
| 2,537,189 | King | Jan. 9, 1951 |
| 2,580,926 | Johnson et al. | Jan. 1, 1952 |
| 2,595,258 | Hildred | May 6, 1952 |
| 2,692,013 | Duquesne | Oct. 19, 1954 |
| 2,708,954 | Schultz | May 24, 1955 |
| 2,772,726 | Mercaldo | Dec. 4, 1956 |
| 2,815,802 | Schultz | Dec. 10, 1957 |
| 2,816,502 | Eisman | Dec. 17, 1957 |